(12) United States Patent
Paskell et al.

(10) Patent No.: US 11,624,647 B2
(45) Date of Patent: Apr. 11, 2023

(54) SYSTEMS AND METHODS FOR CALIBRATING A PAYLOAD SENSING SYSTEM OF A VEHICLE

(71) Applicant: Ford Global Technologies, LLC, Dearborn, MI (US)

(72) Inventors: Kerry Lance Paskell, Detroit, MI (US); Jason Michael Moore, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 269 days.

(21) Appl. No.: 17/036,133

(22) Filed: Sep. 29, 2020

(65) Prior Publication Data
US 2022/0099479 A1  Mar. 31, 2022

(51) Int. Cl.
*G01G 23/01* (2006.01)
*G01G 19/12* (2006.01)

(52) U.S. Cl.
CPC ............. *G01G 23/01* (2013.01); *G01G 19/12* (2013.01)

(58) Field of Classification Search
CPC ................................ G01G 19/12; G01G 23/01
See application file for complete search history.

(56) References Cited

U.S. PATENT DOCUMENTS

| | | | | |
|---|---|---|---|---|
| 3,976,150 A | * | 8/1976 | Wilson | G01G 11/006 73/1.13 |
| 5,710,716 A | * | 1/1998 | Hurst | G01L 25/00 702/155 |
| 5,900,591 A | * | 5/1999 | Liubakka | G01G 11/006 73/1.13 |
| 6,560,561 B1 | * | 5/2003 | Foster | G01G 19/08 701/50 |
| 6,633,663 B1 | * | 10/2003 | Slesinger | H05K 13/0812 382/199 |
| 10,801,881 B2 | * | 10/2020 | Wuhrmann | G01G 19/024 |
| 2012/0248082 A1 | * | 10/2012 | O'Connell | B23K 9/16 219/136 |
| 2020/0124464 A1 | | 4/2020 | Mount et al. | |
| 2020/0249072 A1 | * | 8/2020 | Mayer | B61D 47/005 |

FOREIGN PATENT DOCUMENTS

| | | |
|---|---|---|
| CN | 101435717 | 5/2009 |
| CN | 207423355 | 5/2018 |
| CN | 208238921 | 12/2018 |

* cited by examiner

*Primary Examiner* — Randy W Gibson
(74) *Attorney, Agent, or Firm* — Burris Law, PLLC

(57) ABSTRACT

A method includes positioning, by a robot, a servo press proximate one or more reference identifiers of the vehicle. The method includes applying, by the servo press, a known weight to the vehicle. The method includes calibrating the payload monitoring system of the vehicle based on data from a plurality of payload sensors in response to applying the known weight.

19 Claims, 5 Drawing Sheets

SYSTEMS AND METHODS FOR CALIBRATING A PAYLOAD SENSING SYSTEM OF A VEHICLE

FIELD

The present disclosure relates to systems and/or methods for calibrating a payload sensing system of a vehicle.

BACKGROUND

The statements in this section merely provide background information related to the present disclosure and may not constitute prior art.

In a manufacturing environment, a vehicle may be subject to one or more vehicle end-of-line (EOL) testing routines to test and verify the functionality of various components of the vehicle, such as powertrain components, vehicle network components, body components, and chassis components, among others. As an example, the vehicle may be subjected to a payload calibration routine, where the vehicle's load capacity is determined and where the vehicle is calibrated based on the determined load capacity. However, due to the variation in vehicle geometries and payloads, it is difficult to perform payload calibration routines that are accurate and inhibit damage to vehicle components.

These and other issues related to processing data generated by a vehicle EOL testing routine are addressed by the present disclosure.

SUMMARY

This section provides a general summary of the disclosure and is not a comprehensive disclosure of its full scope or all of its features.

The present disclosure provides payload calibration method for calibrating a payload monitoring system of a vehicle. The method includes positioning, by a robot, a servo press proximate one or more reference identifiers of the vehicle. The method includes applying, by the servo press, a known weight to the vehicle. The method includes calibrating the payload monitoring system of the vehicle based on data from a plurality of payload sensors in response to applying the known weight.

In some forms, the method further includes selecting a calibration routine for the vehicle based on a type of the vehicle.

In some forms, the calibration routine is selected based on a wheelbase of the vehicle.

In some forms, the known weight applied to the one or more reference identifiers of the vehicle is further based on a payload limit corresponding to the calibration routine.

In some forms, the method further includes determining a location of the one or more reference identifiers based on image data from one or more image sensors, and the robot is controlled to position the servo press proximate the one or more reference identifiers of the vehicle based on the location of the one or more reference identifiers.

In some forms, the one or more reference identifiers include a plurality of bolts located at a bed of the vehicle.

In some forms, calibrating the vehicle based on the payload sensor data from the plurality of payload sensors further includes transmitting the data from the plurality of payload sensors to a vehicle controller of the vehicle and selectively performing a corrective action based on the data from the plurality of payload sensors.

In some forms, the data from the plurality of payload sensors includes curb weight data representing a curb weight of the vehicle obtained by the plurality of payload sensors. In some forms, the data from the plurality of payload sensors includes aggregate data representing the curb weight and the known weight applied to the vehicle. In some forms, the correction action is selectively performed based on the curb weight data, the aggregate data, and a payload limit of the vehicle.

In some forms, the method further includes providing a counterforce element that contacts the servo press while the servo press applies the known weight to the one or more reference identifiers of the vehicle.

In some forms, applying, by the servo press, the known weight to the vehicle further includes selecting the known weight from among a plurality of defined weights, where the plurality of defined weights is based on a payload limit of the vehicle, and where for each of the defined weights, the payload of the vehicle is measured, and the payload monitoring system of vehicle is calibrated based on data from the plurality of payload sensors for the plurality of defined weights.

The present disclosure provides a payload calibration method for a payload monitoring system of a vehicle. The method includes selecting a calibration routine based on a wheelbase of the vehicle and controlling, based on the calibration routine, a robot to position a servo press such that the servo press is proximate one or more reference identifiers of the vehicle. The method includes controlling the robot and the servo press such that the servo press applies a known weight to the vehicle, where the known weight is based on a payload limit corresponding to the calibration routine. The method includes calibrating the vehicle based on payload sensor data from a plurality of payload sensors in response to applying the known weight.

In some forms, the method further includes determining a location of the one or more reference identifiers based on image data from one or more image sensors, and the robot is controlled to position the servo press proximate the one or more reference identifiers of the vehicle based on the location of the one or more reference identifiers.

In some forms, the one or more reference identifiers include a plurality of bolts located at a bed of the vehicle.

In some forms, calibrating the vehicle based on the payload sensor data from the plurality of payload sensors further includes: transmitting the payload sensor data to a vehicle controller of the vehicle and selectively performing a corrective action based on the payload sensor data.

The present disclosure provides a payload calibration system for a vehicle comprising a plurality of payload sensors. The system includes a robot, a servo press attached to the robot, and a controller communicably coupled to the robot and to the servo press. The controller is configured to select a calibration routine based on the vehicle and control, based on the calibration routine, the robot to position the servo press such that the servo press is proximate one or more reference identifiers of the vehicle. The controller is configured to control the robot and the servo press such that the servo press applies a known weight to the one or more reference identifiers of the vehicle.

In some forms, the controller is configured to select the calibration routine based on a wheelbase of the vehicle.

In some forms, the controller is further configured to determine a location of the one or more reference identifiers based on image data from one or more image sensors. In some forms, the controller is configured to control the robot to position the servo press proximate the one or more reference identifiers of the vehicle based on the location of the one or more reference identifiers, where the one or more reference identifiers include a plurality of bolts located in a bed of the vehicle.

In some forms, the system further includes a counterforce element that contacts the servo press while the servo press applies the known weight to the one or more reference identifiers of the vehicle.

In some forms, the counterforce element is disposed separately from the servo press.

In some forms, the counterforce element is attached to the servo press.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
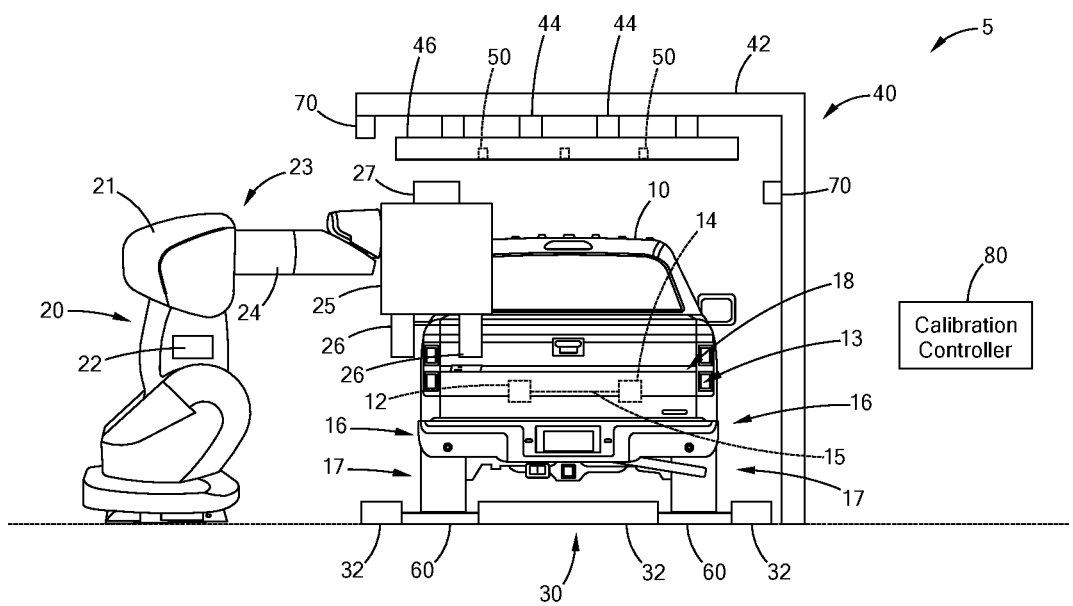
FIG. 1A illustrates a vehicle end-of-line payload calibration system in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to systems and methods for calibrating a payload system of a vehicle. A method includes positioning, by a robot, a servo press proximate one or more reference identifiers of the vehicle and applying, by the servo press, a known weight to the vehicle. The example method includes calibrating the payload monitoring system of the vehicle based on data from a plurality of payload sensors in response to applying the known weight. By utilizing the robot and the servo press, multiple vehicle design variants can be accommodated for calibrating the payload system of the vehicle, as the components are mobile and adaptable. In addition, the servo press improves the accuracy of the calibration of the payload system of the vehicle by providing controllable accurate force (i.e., weight). It should be readily understood that the systems and methods for calibrating the payload system of the vehicle of the present disclosure addresses other issues and should not be limited to the examples provided herein.

Figure 1B:
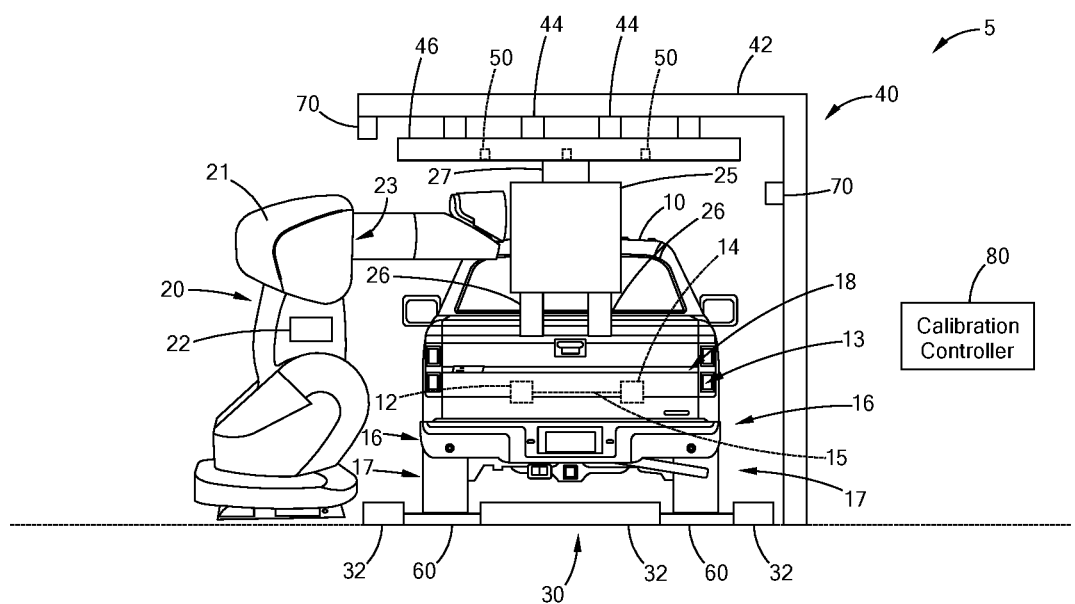
FIG. 1B illustrates a servo press applying a force to a vehicle in a vehicle end-of-line payload calibration system in accordance with the teachings of the present disclosure.
Figure 1C:
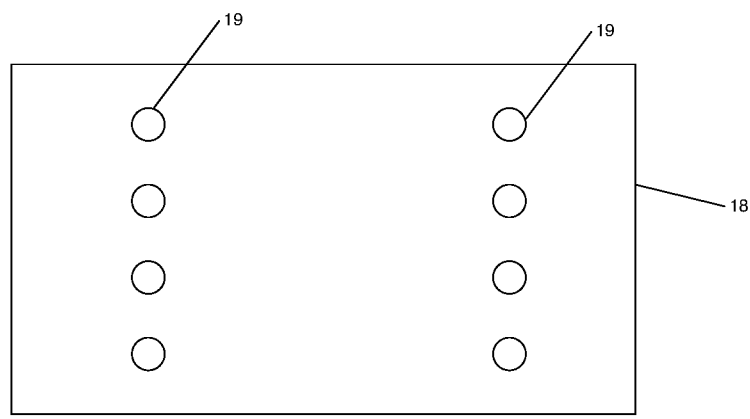
FIG. 1C illustrates a plurality of reference identifiers of the vehicle in accordance with the teachings of the present disclosure.

With reference to FIGS. 1A-1C, a payload calibration system 5 for performing a vehicle end-of-line (EOL) testing routine on a vehicle 10 is provided. In an example application, the vehicle 10 includes a communication device 12, a vehicle payload monitoring system 13 having a payload control module (PCM) 14, and a vehicle communication network 15 (e.g., a controlled area network (CAN), a local interconnect network (LIN), and/or other suitable communication network). The vehicle communication network 15 is configured to communicably couple the PCM 14, the communication device 12, and other vehicle controllers/sensors with one another.

In one form, the communication device 12 is an external device (e.g., a dongle) that may be attached to and detached from the vehicle 10 to communicably couple an external system (e.g., the payload calibration system 5, among others) with one of more controller of the vehicle 10 the PCM 14. In one form, the communication device 12 is connected to an on-board diagnostic (OBD) port of the vehicle 10, and the communication device 12 includes various network interfacing hardware for exchanging data between the external system and the PCM 14. As an example, the network interfacing hardware provides for communication using one of a wired communication protocol (e.g., hardware for communicating via a universal serial bus, a category-5 cable, a serial cable, and the like) and/or a wireless communication protocol (e.g., hardware for communicating via a Bluetooth®-type protocol, a cellular protocol, a WiFi-type protocol, an NFC protocol, a UWB protocol, and the like).

In one form, the vehicle payload monitoring system 13 further includes one or more weight sensors 16 configured to generate sensor data representing a weight applied to the vehicle 10. In one form, the vehicle payload monitoring system 13 is configured to generate curb weight data representing a curb weight of the vehicle 10 (i.e., the weight of vehicle 10 without any external components) and/or aggregate data representing the curb weight and a known weight applied to the vehicle 10. As described below in further detail, the PCM 14 calibrates the vehicle payload monitoring system 13 by performing a corrective action based on the curb weight data, the aggregate data, and a payload limit of the vehicle 10. As used herein, "payload limit" refers to a known weight limit (e.g., a weight defined by a manufacturer of the vehicle 10 and/or a weight empirically and uniquely defined for each vehicle 10) of one or more external components (e.g., a load, cargo, among others) that can be added to the vehicle 10 while satisfying one or more defined safety criterion of vehicle 10.

In one form, the PCM 14 includes one or more processor circuits configured to execute machine-readable instructions stored in one or more nontransitory computer-readable mediums, such as a random-access memory (RAM) circuit and/or a read-only memory (ROM) circuit. The PCM 14 is configured to analyze data from the weight sensors of the vehicle to provide for example a load (i.e., payload) carried by the vehicle 10 and to provide notifications related to the payload via a user interface, such as an audio-visual system within the vehicle 10. As an example, the PCM 14 may display a notification to on a display screen in the passenger cabin to notify a user that the payload of the vehicle 10 has exceeded a predetermined threshold or a current payload measurement along with the payload limit of the vehicle 10. As another example, the PCM 14 may transmit a notification to the user interface indicating that the payload of the vehicle 10 and/or total weight of the vehicle exceeds a weight limit for a particular road the vehicle 10 is traveling or intends to travel on. While the vehicle payload monitoring system 13 is provided as having a dedicated electronic control module, functions performed by the PCM 14 may be provided with an existing vehicle control module or other suitable module.

The PCM 14 is further configured to calibrate the vehicle payload monitoring system 13 based on data generated by the vehicle payload monitoring system 13, the payload sensors 60, and/or the calibration controller 80. More particularly, during a payload calibration routine, the PCM 14 may obtain data from the payload sensors 60 and/or the calibration controller 80 and compare the obtained data to data generated by the vehicle payload monitoring system 13 to calibrate the vehicle payload monitoring system 13 accordingly, as described below in further detail.

Among other structural components, the vehicle 10 further includes wheels 17, a bed 18 (also shown in FIG. 1C), and one/or more reference identifiers 19 (shown in FIG. 1C). In one form and as shown in FIG. 1C, the one or more reference identifiers 19 are provided in the bed 18 of the vehicle 10. The one or more reference identifiers 19 include any physical component of the vehicle 10 in which the calibration controller 80 utilizes as a reference while performing the payload calibration routine, as described below in further detail. As an example, the reference identifiers 19 include a plurality of bolts located in the bed 18 of the vehicle 10. It should be understood that the reference identifiers 19 can be implemented by any other physical component of the vehicle 10 in other forms.

Referring back to FIGS. 1A and 1B, the payload calibration system 5 generally includes a robot system 20, a guidance system 30, an infrastructure system 40, one or more identification sensors 50, payload sensors 60, one or more workspace sensors 70, and a calibration controller 80. While the calibration controller 80 is illustrated as being located with the other components of the payload calibration system 5, it should be understood that the calibration controller 80 may be positioned remotely from the other components of the payload calibration system 5 in other forms. In one form, the various components of the payload calibration system 5 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others) and/or a wired communication protocol.

In one form, the robot system 20 includes a robot 21 (e.g., industrial robot), which includes a system controller 22, one or more actuators 23, and one or more robotic links 24. The robot system 20 further includes a servo press 25, end effectors 26, and an engagement element 27. The servo press 25 is attached to one of the robotic links 24, and the end effectors 26 are attached to a first end of the servo press 25. The engagement element 27 is attached to a second, opposite end of the servo press 25. The servo press 25 and the one or more actuators 23 are communicably coupled to the system controller 22.

In one form, the robot 21 may be confined to a given area in the payload calibration system 5. As an example, the robot 21 may be provided in an uncaged area having no fence or other containment-like structure for confining the movement of the robot 21. As another example, the robot 21 may be provided in a caged area having a fence or other containment-like structure for confining the movement of the robot 21. In another form, the robot 21 is a mobile robot that is partially or fully-autonomous and configured to autonomously move to various locations of the payload calibration system 5.

In one form, the system controller 22 is configured to operate actuators 23 to control the motion of one or more robotic links 24 (e.g., robotic arms) attached thereto to perform one or more automated operations defined in a task database. As an example, the system controller 22 is configured to, in response to receiving a command from the calibration controller 80 to initiate the payload calibration routine, control the robot 21 to position the servo press 25 and/or the end effectors 26 proximate (i.e., adjacent and/or near) at least one of the reference identifiers 19 and to apply a known weight to the one or more reference identifiers 19. To perform the functionality described herein, the system controller 22 may include one or more processor circuits that are configured to execute machine-readable instructions stored in one or more nontransitory computer-readable mediums, such as a random-access memory (RAM) circuit and/or read-only memory (ROM) circuit. The system controller 22 may also include other components for performing the operations described herein such as, but not limited to, movement drivers and systems, transceivers, routers, and/or input/output interface hardware.

In one form, the guidance system 30 includes guides 32 that assist an operator or technician in aligning the vehicle 10 with the payload sensors 60. In one form, the guides are provided within or on a flooring upon which the vehicle 10 is standing.

In one form, the infrastructure system 40 includes an infrastructure element 42, attachment elements 44, and a counterforce element 46. The counterforce element 46 is secured (e.g., fixedly attached) to the infrastructure element 42 via the attachment elements 44. The counterforce element 46 is configured to contact the engagement element 27 of the servo press 25 and provide an opposing force while the servo press 25 supplies the known weight to the reference identifiers 19 during the payload calibration routine. Accordingly, the counterforce element 46, attachment elements 44, and the infrastructure element 42 may be made of a material and have a geometry to provide a sufficient opposing force to the servo press 25 during the payload calibration routine.

While FIGS. 1A-1B illustrate the counterforce element 46 provided at the infrastructure system 40, it should be understood that the counterforce element 46 may be attached at various other locations in the payload calibration system 5 in other forms. As an example, the counterforce element 46 may be secured to the servo press 25 and may partially or completely surround the engagement element 27 to have the counterforce element 46 contact the engagement element 27 of the servo press 25 and provide an opposing force during the payload calibration routine.

In one form, the identification sensors 50 include imaging sensors that obtain imaging data of the vehicle 10 such as, but not limited to: a two-dimensional camera, a three-dimensional camera, an infrared sensor, a radar scanner, a laser scanner, a light detection and ranging (LIDAR) sensor, and/or an ultrasonic sensor. In one form, the identification sensors 50 are provided on a surface of or within the counterforce element 46 and, as such, the counterforce element 46 may be made of a material that enables the one or more identification sensors 50 to obtain the imaging data (e.g., a transparent material). The identification sensors 50 are configured to provide the imaging data to the calibration controller 80, which then utilizes the imaging data to determine the type of vehicle 10 and/or the position of the one or more reference identifiers 19 within the payload calibration system 5. As an example, the identification sensors 50 are configured capture images of the reference identifiers 19, vehicle-identification-number, and/or other characteristics that uniquely identify the vehicle 10.

In one form, the payload sensors 60 are sensors that are configured to output sensor data indicating a weight or force applied to the respective wheel 16 of the vehicle 10 during the payload calibration routine. As an example, the payload sensors 60 include one of weight sensors, pneumatic load cells, capacitive load cells, strain gauge load cells, hydraulic load cells, force transducers, among others. Furthermore, in one form, a number of payload sensors 60 is equal to a number of wheels 17 (e.g., the payload calibration system 5 includes four payload sensors 60).

In some forms, the payload sensors 60 are employed to measure reference curb weight representing a curb weight of the vehicle 10 and/or reference aggregate representing the reference curb weight and a known weight applied to the vehicle 10. In one form, based on data from the payload sensors, the PCM 14 calibrates the vehicle payload monitoring system 13 by comparing the reference curb weight data and the curb weight data obtained by the vehicle payload monitoring system 13, the reference aggregate data and the aggregate data obtained by the vehicle payload monitoring system 13, and/or the payload limit of the vehicle 10.

In one form, the one or more workspace sensors 70 are employed to monitor the robot 21 and/or the other components of the payload calibration system 5 to determine if a correction safety action is needed. In some forms, the workspace sensors 70 may be imaging sensors configured to obtain image data of a testing area of the payload calibration system 5. As an example, the workspace sensors 70 include, but are not limited to, a two-dimensional camera, a three-dimensional camera, an infrared sensor, a radar scanner, a laser scanner, a LIDAR sensor, an ultrasonic sensor, and/or the like.

Figure 2:
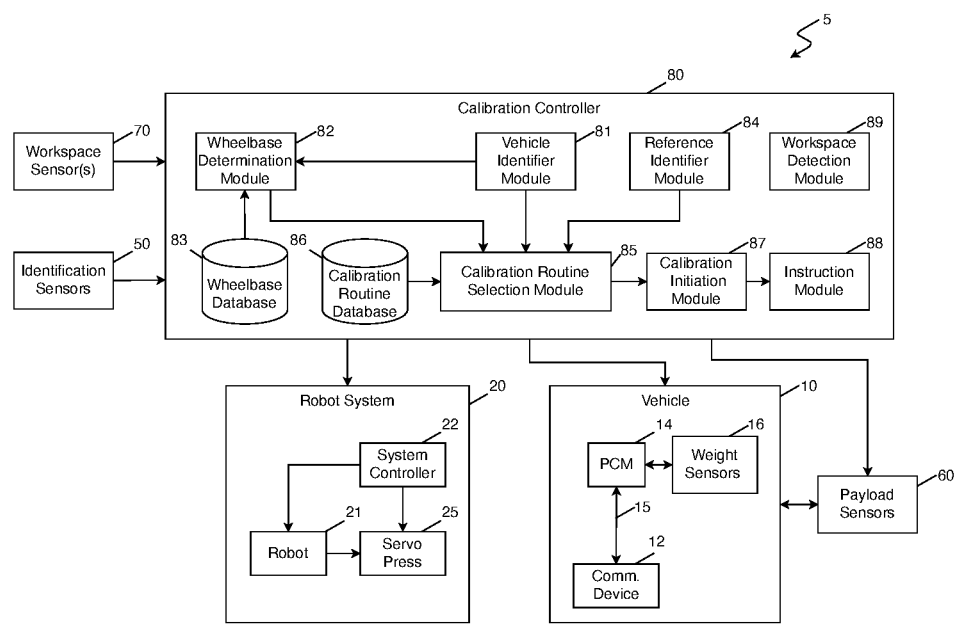
FIG. 2 is a block diagram of a calibration controller in accordance with the teachings of the present disclosure.

With reference to FIG. 2, in one form, the calibration controller 80 includes a vehicle identifier module 81, a wheelbase determination module 82, a wheelbase database 83, a reference identifier module 84, a calibration routine selection module 85, a calibration routine database 86, a calibration initiation module 87, an instruction module 88, and a workspace detection module 89. It should be readily understood that any one of the components of the calibration controller 80 can be provided at the same location or distributed at different locations and communicably coupled accordingly. To perform the functionality as described herein, the calibration controller 80 includes one or more processor circuits that are configured to execute machine-readable instructions stored in one or more nontransitory computer-readable mediums, such as a RAM circuit and/or ROM circuit. It should be readily understood that the calibration controller 80 may include other components for performing the operations described herein such as, but not limited to, communication transceivers, routers, input/output communication interfaces, databases, among others.

In one form, the vehicle identifier module 81 is configured to identify the vehicle type of the vehicle 10 based on the image data from the identification sensors 50. As an example, the vehicle identifier module 81 employs known digital image recognition techniques to process the image data from the one or more identification sensors 50 and identify the vehicle type.

In one form, the wheelbase determination module 82 determines a wheelbase of the wheels 17 (i.e., the distance between a center of the front wheels 17 and a center of the rear wheels 17) of the vehicle 10 based on the vehicle type identified by the vehicle identifier module 81. As an example, the wheelbase determination module 82 determines the wheelbase by referencing a plurality of wheelbase entries in the wheelbase database 83, where each of the plurality of wheelbase entries uniquely correspond a particular vehicle type to a given wheelbase.

In one form, the reference identifier module 84 is configured to identify the location of the one or more reference identifiers 19 based on the image data from the identification sensors 50. As an example, the reference identifier module 84 employs known digital image recognition techniques to process the image data from the one or more identification sensors 50 and locate the one or more reference identifiers 19 in the vehicle 10.

In one form, the calibration routine selection module 85 is configured to select a payload calibration routine for the vehicle 10 from the calibration routine database 86 based on the vehicle type, the wheelbase of the vehicle 10, and/or the location of the one or more reference identifiers 19. In some forms, each of the payload calibration routines for the vehicle 10 stored in the calibration routine database 86 uniquely correspond to a given vehicle type, a given wheelbase of the vehicle 10, and/or a given location of the one or more reference identifiers 19.

In one form, each of the payload calibration routines stored in the calibration routine database 86 includes robot instructions for positioning the servo press 25 and/or the end effectors 26 proximate the one or more reference identifiers 19 of the identified vehicle 10. Furthermore, each of the payload calibration routines stored in the calibration routine database 86 includes servo press instructions for applying one or more known weights to the one or more reference identifiers 19 of the identified vehicle 10. As an example, the servo press instructions for controlling the servo press 25 include applying 50% of a payload limit, subsequently applying 95% of the payload limit, and then applying 70% of the payload limit. It should be understood that the servo press instructions can include various percentages of the payload limit and is not limited to the example described herein.

In one form, the calibration initiation module 87 is configured to receive an input indicating a command to initiate a payload calibration routine. As an example, the calibration initiation module 87 may receive an input from an interface element of the calibration controller 80, such as a keyboard, mouse, a touchscreen display, a voice user interface, among others, indicating a command to initiate the identified payload calibration routine.

In response to the calibration initiation module 87 receiving the input, the instruction module 88 broadcasts a command to the payload sensors 60, the system controller 22 of the robot system 20, and the PCM 14 to collectively initiate the payload calibration routine. As an example, the instruction module 88 broadcasts a command to the payload sensors 60 to generate and transmit the reference curb weight data and the reference aggregate data. As another example, the instruction module 88 broadcasts a command to the system controller 22 of the robot system 20 to control the robot 21 and the servo press 25 in accordance with the identified calibration routine, the identified robot instructions, and the identified servo press instructions. As yet another example, the instruction module 88 broadcasts a command to the PCM 14 of the vehicle 10 to obtain the curb weight data and the aggregate data from the vehicle payload monitoring system 13 and calibrate the vehicle payload monitoring system 13 by performing a corrective action. An example payload calibration routine is described below with reference to FIG. 3.

In one form, the workspace detection module 89 is configured to analyze the data from the workspace sensors 70 to monitor the test area in accordance with safety guidelines. More particularly, based on the data, the workspace detection module 89 is configured to determine if components and/or technicians within the test area of the payload calibration system 5 are performing within specific safety guidelines (e.g., an operator has entered the payload calibration system 5 during the payload calibration routine) and performs a corrective safety action (e.g., stop the payload calibration routine) in response to a safety guideline not being met. In one form, the functions performed by the workspace detection module 89 may be provided with another system and thus, the calibration controller 80 may not include the workspace detection module 89.

Figure 3:
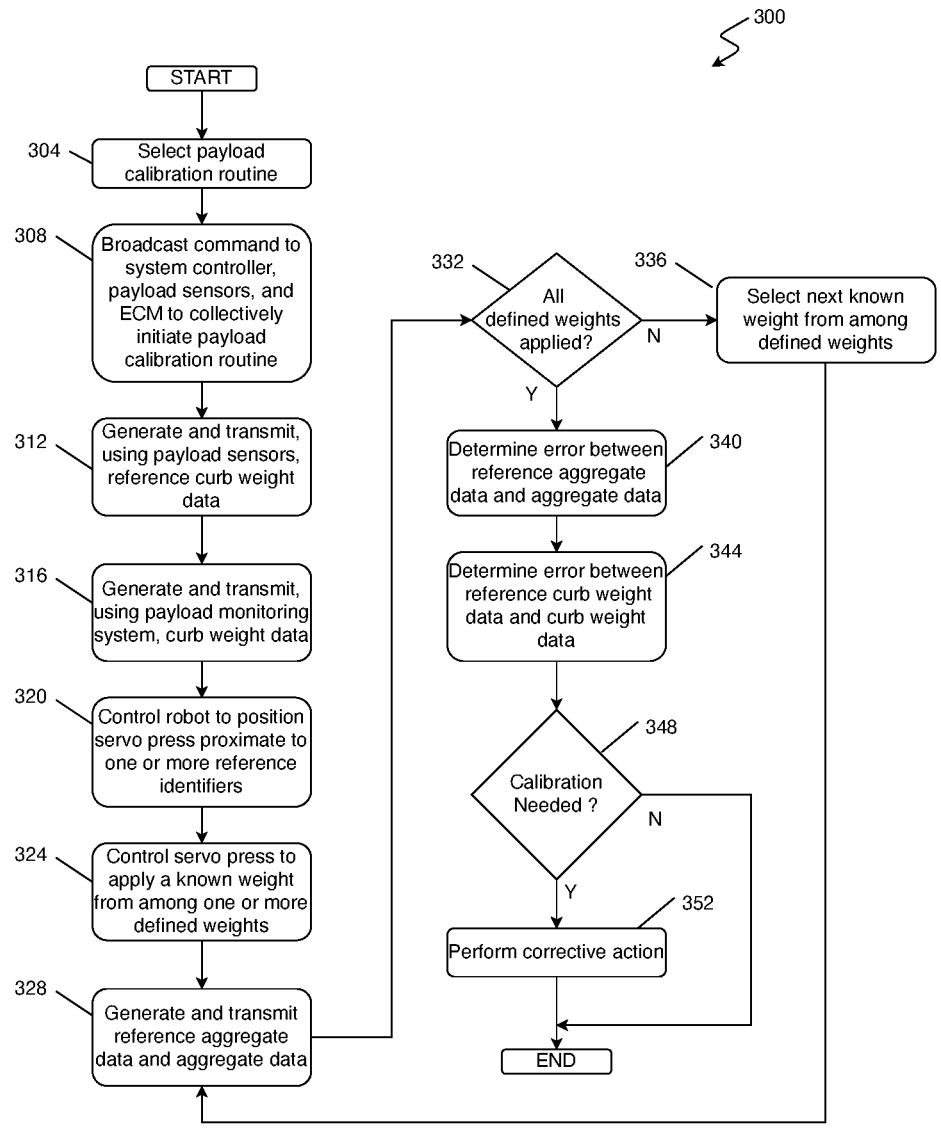
FIG. 3 illustrates an example control routine in accordance with the teachings of the present disclosure.

With reference to FIG. 3, an example routine 300 for performing the payload calibration routine and performing the corrective action based on the payload calibration routine is shown. At 304, the calibration controller 80 selects a payload calibration routine for the vehicle 10 based on the vehicle type, the wheelbase of the vehicle 10, and/or the location of the one or more reference identifiers 19.

At 308, the calibration controller 80 broadcasts a command to the payload sensors 60, the system controller 22 of the robot system 20, and the PCM 14 to collectively initiate the payload calibration routine. As an example, the command broadcasted to the payload sensors 60 includes a command to begin generating and transmitting the reference curb weight data and the reference aggregate data. Furthermore and as described above, the command broadcasted to the system controller 22 includes a command to begin controlling the robot 21 and the servo press 25 in accordance with the identified calibration routine, the identified robot instructions, and the identified servo press instructions. Additionally, the command broadcasted to the PCM 14 includes a command to begin obtaining the curb weight data and the aggregate data from the vehicle payload monitoring system 13 and calibrating the vehicle payload monitoring system 13.

At 312, with no weight being placed onto the vehicle 10, the payload sensors 60 measure the weight of the vehicle 10 to obtain the reference curb weight data of the vehicle 10 and transmits the data to the PCM 14. At 316, the vehicle payload monitoring system 13 also measures the weight of the vehicle 10 to obtain a curb weight data of the vehicle 10, which is stored by the PCM 14.

At 320, the system controller 22 controls the robot 21 to position the servo press 25 proximate the reference identifiers 19 of the vehicle 10 in accordance with the identified robot instructions and the identified calibration routine. At 324, the system controller 22 controls the servo press 25 to apply a selected weight from among one or more known weights associated with the identified calibration routine. As an example, the servo press 25 may first apply 50% of a payload limit (e.g., 1,500 lbs. when the payload limit is equal to 3,000 lbs.), subsequently apply 95% of the payload limit (e.g., 2,700 lbs.), and then apply 70% of the payload limit (e.g., 2,100 lbs.).

At 328, the payload sensors 60 and the vehicle payload monitoring system 13 generate and transmit the reference aggregate data and the aggregate data of the vehicle 10, respectively, to the PCM 14 while the servo press 25 applies the one or more known weights. At 332, the system controller 22 determines whether each defined weight has been applied to the vehicle 10. If so, the routine 300 proceeds to 340. Otherwise, if the system controller 22 determines each defined weight has not been applied to the vehicle 10, the routine 300 proceeds to 336, where the system controller 22 controls the servo press 25 to apply a next known weight from among one or more known weights associated with the identified calibration routine.

At 340, the PCM 14 determines an error between the reference aggregate data and the aggregate data. For example, when the servo press 25 first applies 50% of the payload limit, the payload sensors 60 may generate reference aggregate data of 6,500 lbs., and the vehicle payload monitoring system 13 may generate aggregate data of 6,370 lbs., which is a difference of 130 lbs. Furthermore, when the servo press 25 applies 95% of the payload limit, the payload sensors 60 may generate reference aggregate data of 7,700 lbs. and the vehicle payload monitoring system 13 may generate aggregate data of 7,546 lbs., which is a difference of 154 lbs. Likewise, when the servo press 25 applies 70% of the payload limit, the payload sensors 60 may generate reference aggregate data of 7,100 lbs., and the vehicle payload monitoring system 13 may generate aggregate data of 6,958 lbs., which is a difference of 142 lbs. In some forms, the error is based on a maximum error, a minimum error, an average error, among other statistical representations of the error between the reference aggregate data and the aggregate data. In this example, the PCM 14 determines that the error is 2% each time the servo press 25 applied the known weight.

At 344, the PCM 14 determines an error between the reference curb weight data and the curb weight data. For example, the reference curb weight data may be 5000 lbs., and the curb weight data may be 4,900 lbs., which is a difference of 100 lbs. In some forms, the error is based on a maximum error, a minimum error, an average error, among other statistical representations of the error between the reference curb weight data and the curb weight data. In this example, the PCM 14 determines that the error between the reference curb weight data and the curb weight data is 2%.

At 348, the PCM 14 determines whether a calibration is needed based on the errors. In some forms, the PCM 14 determines a calibration is needed if one or more of the errors determined at 332 and 336 are greater than a predetermined threshold error. If the PCM 14 determines a calibration is needed at 340, the routine 300 proceeds to 344. If the PCM 14 determines a calibration is not needed at 340, the routine 300 ends.

At 352, the PCM 14 calibrates the vehicle payload monitoring system 13 by performing a corrective action. In one form, the corrective action includes applying an offset to the predefined payload limit and/or predefined curb weight stored in the PCM 14 based on the errors. Using the above example, the PCM 14 may apply an offset corresponding to the 2% error to the vehicle payload monitoring system 13. In another form, the corrective action includes designating the vehicle 10 as needing further service prior and/or as needing additional software and/or structural actions to accommodate for the error. The routine 300 then ends.

It should be understood that routine 300 is merely an example routine and other routines may be performed in other forms. For example, in one form, the payload sensors 60 may transmit the data to the PCM 14 after all the measurements are taken. In another form, the payload sensors 60 transmits data to the calibration controller 80, which may then transmit the data to the PCM 14 or collect the measurement data for the defined weights and then send them collectively to the PCM 14.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A payload calibration method for calibrating a payload monitoring system of a vehicle, the method comprising:
    positioning, by a robot, a servo press proximate one or more reference identifiers of the vehicle;
    selecting a calibration routine for the vehicle based on a type of the vehicle;
    applying, by the servo press, a known weight to the vehicle; and
    calibrating the payload monitoring system of the vehicle based on data from a plurality of payload sensors in response to applying the known weight.

2. The method of claim 1, wherein the calibration routine is selected based on a wheelbase of the vehicle.

3. The method of claim 1, wherein the known weight applied to the one or more reference identifiers of the vehicle is further based on a payload limit corresponding to the calibration routine.

4. The method of claim 1 further comprising:
    determining a location of the one or more reference identifiers based on image data from one or more image sensors, wherein
    the robot is controlled to position the servo press proximate the one or more reference identifiers of the vehicle based on the location of the one or more reference identifiers.

5. The method of claim 4, wherein the one or more reference identifiers include a plurality of bolts located at a bed of the vehicle.

6. The method of claim 1, wherein calibrating the vehicle based on the data from the plurality of payload sensors further comprises:
    transmitting the data from the plurality of payload sensors to a vehicle controller of the vehicle; and
    selectively performing a corrective action based on the data from the plurality of payload sensors.

7. The method of claim 6, wherein:
    the data from the plurality of payload sensors includes curb weight data representing a curb weight of the vehicle obtained by the plurality of payload sensors;
    the data from the plurality of payload sensors includes aggregate data representing the curb weight and the known weight applied to the vehicle; and
    the correction action is selectively performed based on the curb weight data, the aggregate data, and a payload limit of the vehicle.

8. The method of claim 1 further comprising providing a counterforce element that contacts the servo press while the servo press applies the known weight to the one or more reference identifiers of the vehicle.

9. The method of claim 1, wherein applying, by the servo press, the known weight to the vehicle further comprises:
    selecting the known weight from among a plurality of defined weights, wherein the plurality of defined weights is based on a payload limit of the vehicle,
    wherein for each of the defined weights, the payload of the vehicle is measured, and the payload monitoring system of the vehicle is calibrated based on data from the plurality of payload sensors for the plurality of defined weights.

10. A payload calibration method for a payload monitoring system of a vehicle, the payload calibration method comprising:
    selecting a calibration routine based on a wheelbase of the vehicle;
    controlling, based on the calibration routine, a robot to position a servo press such that the servo press is proximate one or more reference identifiers of the vehicle;

controlling the robot and the servo press such that the servo press applies a known weight to the vehicle, wherein the known weight is based on a payload limit corresponding to the calibration routine; and calibrating the vehicle based on payload sensor data from a plurality of payload sensors in response to applying the known weight.

11. The method of claim 10 further comprising:

determining a location of the one or more reference identifiers based on image data from one or more image sensors; and the robot is controlled to position the servo press proximate the one or more reference identifiers of the vehicle based on the location of the one or more reference identifiers.

12. The method of claim 11, wherein the one or more reference identifiers include a plurality of bolts located at a bed of the vehicle.

13. The method of claim 10, wherein calibrating the vehicle based on the payload sensor data from the plurality of payload sensors further comprises:

transmitting the payload sensor data to a vehicle controller of the vehicle; and selectively performing a corrective action based on the payload sensor data.

14. A payload calibration system for a vehicle comprising a plurality of payload sensors, the system comprising:

a robot;

a servo press attached to the robot; and a controller communicably coupled to the robot and to the servo press, wherein the controller is configured to:

select a calibration routine based on the vehicle;

control, based on the calibration routine, the robot to position the servo press such that the servo press is proximate one or more reference identifiers of the vehicle; and control the robot and the servo press such that the servo press applies a known weight to the one or more reference identifiers of the vehicle.

15. The system of claim 14, wherein the controller is configured to select the calibration routine based on a wheelbase of the vehicle.

16. The system of claim 14, wherein:

the controller is further configured to determine a location of the one or more reference identifiers based on image data from one or more image sensors; and the controller is configured to control the robot to position the servo press proximate the one or more reference identifiers of the vehicle based on the location of the one or more reference identifiers, wherein the one or more reference identifiers include a plurality of bolts located in a bed of the vehicle.

17. The system of claim 14 further comprising a counterforce element that contacts the servo press while the servo press applies the known weight to the one or more reference identifiers of the vehicle.

18. The system of claim 17, wherein the counterforce element is disposed separately from the servo press.

19. The system of claim 17, wherein the counterforce element is attached to the servo press.

* * * * *